April 20, 1954

G. HEPP 2,676,269

CIRCUIT ARRANGEMENT FOR DETECTING
PHOTONS OR CORPUSCULAR PARTICLES

Filed Nov. 25, 1949

INVENTOR.
Gerard Hepp
BY
AGENT

INVENTOR.
Gerard Hepp
BY
AGENT

UNITED STATES PATENT OFFICE 2,676,269

CIRCUIT ARRANGEMENT FOR DETECTING PHOTONS OR CORPUSCULAR PARTICLES

Gerard Hepp, Eindhoven, Netherlands, assignor to Hartford National Bank and Trust Company, Hartford, Conn., as trustee Application November 25, 1949, Serial No. 129,325

Claims priority, application Netherlands December 13, 1948

10 Claims. (Cl. 250—83.6)

The invention relates to circuit-arrangements and to devices for detecting photons or corpuscular particles, use being made, for example, of an ionisation tube. The term "ionisation tube" is to be understood to mean herein a device in which the ionising power of particles or photons is utilized for initiating a gas discharge between two electrodes having a potential difference. These devices include, inter alia Geiger-Müller tubes.

It is known that owing to addition of organic vapours some of these ionisation tubes frequently have the property that an originally initiated discharge is spontaneously extinguished; with other tubes, the gas-ionisation tubes, an external circuit is required which, upon the occurrence of a discharge, reduces the voltage between the electrodes to an extent such that the discharge is extinguished. Such tubes have a threshold voltage, below which it is not possible for a discharge to take place.

The supply voltage for such ionisation tubes, which for various types of these tubes varies from several hundred volts to several thousand volts, is often obtained from a control apparatus which supplies a voltage adjustable with some precision and independent of mains voltage fluctuations. This is necessary, since both the value and the number of discharges occurring with a constant number of incoming particles, varies to a certain extent with the supply voltage. However, particularly for high voltages, such a control apparatus is costly and complicated.

If use is made of a non-automatically extinguishing tube with a threshold voltage of, for example, 900 v. and if a supply voltage of 1000 v. is applied, approximately 100 v. will normally be abstracted by the extinguishing circuit. With a mains voltage variation of ±5% the supply voltage will vary between 950 v. and 1050 v. so that an opposing voltage of 50 v. and 150 v., respectively is required to be provided by the extinguishing circuit. If a pulse is taken from this extinguishing circuit, for example, in order to feed it to a pulse counting circuit, it will be possible for the amplitude of this pulse to increase by a factor 3, due to which difficulty may arise. This difficulty is further aggravated, if an ammeter is included in the extinguishing circuit. With a constant supply voltage, the deflection of this meter is a measure of the number of discharges and hence of the number of incoming particles. However, if the supply voltage varies, not only does the current during the pulse increase but also, as a rule, the width of the pulse increases. The mean current with a constant number of particles may then vary even in a quadratic relationship with the difference between the supply voltage and threshold voltage.

However, even greater difficulty arises when the threshold voltage, which varies greatly with the nature of the gas-filling of the ionisation tube, becomes modified. As a rule, it will be possible to adjust the supply voltage, but there are cases in which this is not possible, for example, if a gas required to be examined concerning its radio-activity is used directly as a gas-filling of an ionisation tube by causing it to flow through the ionisation tube. It is true that it is known to ensure automatic adjustment of the supply voltage in this case, but this is only ensured at the expense of very great complications. Thus, for example, provision may be made of a second ionisation tube, through which flows the same gas and which contains in addition a radioactive preparation.

The object of the invention is to provide simple means to render the pulse amplitude, the pulse width and the number of the pulses produced substantially independent of the supply voltage. Furthermore, when the invention is utilized, it will frequently not be necessary for the setting, when changing the ionisation tube or other device for detecting particles or photons, to be varied even if any gas-filling thereof varies or is varied.

Although a single inventive idea underlies the invention its application leads to slightly different embodiments, depending on whether the photons or particles are to be detected with the use of a non self-quenching device such as gas ionization tube in which beyond a definite threshold voltage an independent discharge is possible and which, consequently, requires an external extinguishing circuit, or with the use of self quenching devices such as an evacuated photo such cell in which each particle produces only a transient pulse without extinguishing means being necessary.

According to the first aspect of the invention, a circuit-arrangement for detecting photons or corpuscular particles, comprising an ionisation tube in which an automatic discharge is possible beyond a definite threshold voltage, and an external extinguishing circuit, is characterized in that in addition to the extinguishing circuit provision is made of a circuit part which reduces the voltage across the ionisation tube and which does not become operative until the pulse amplitude exceeds a definite value.

In a preferred embodiment of this circuit-arrangement said circuit part comprises a condenser, owing to which the voltage is not immediately restored after the termination of a pulse.

According to the second aspect of the invention, a circuit-arrangement for detecting photons or corpuscular particles, comprising an ionisation tube, in which each photon or particle produces only a transient pulse, is characterized in that provision is made of a circuit part which reduces the voltage across the tube when the pulse exceeds a definite value and which comprises a condenser owing to which, after the termination of a pulse, the voltage is only restored in a period which is many times greater than the period in which the device, after detection of one pulse is unable to detect a new pulse.

In order that the invention may be more clearly understood and readily carried into effect, it will now be described more fully with reference to the accompanying drawing, in which—

Figure 1:
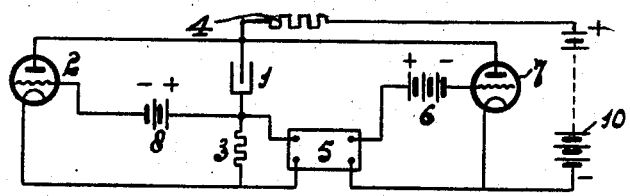
Figs. 1 and 2 show two embodiments of the circut-arrangement according to the invention, illustrating the manner in which the pulse amplitude becomes substantially independent of the supply voltage.

Referring now to Fig. 1, the circuit arrangement comprises an ionisation tube 1 a voltage source 10 and an extinguishing tube 2, the extinguishing circuit being constituted by a well-known Neher-Harper circuit, a current being produced across resistance 4 when the tube 2 becomes conductive owing to a positive pulse being produced across a resistance 3, by which the voltage produced by a battery 8 is opposed.

Connected across resistance 3 is an amplifier 5, which supplies a positive-going output pulse by which a tube 7 is made conductive when the amplitude of this pulse is approximately equal to that of battery 6 which normally cuts off tube 7. When tube 7 becomes conductive, a very low increase in voltage across resistance 3 results in a very great voltage drop across resistance 4, so that the voltage across resistance 3 is diminished and the pulse amplitude across resistance 3 builds up to a value which is approximately equal to the voltage of battery 6 divided by the amplification of the amplifier 5. The higher the amplifications of the amplifier 5 and the tube 7, the smaller will be the divergence of the pulse across resistance 3 relative to the value indicated.

Figure 2:
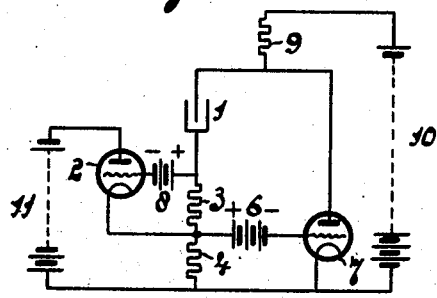

In the circuit-arrangement of Fig. 2, of which components corresponding to those of Fig. 1 are designated by like reference numerals, the amplifier 5 of Fig. 1 is omitted, because the amplification provided by the extinguishing tube 2 is utilised. The amplified voltage is now taken from across resistance 4. When the voltage of the pulse across resistance 4 is equal to the voltage of battery 6, the tube 7 becomes conductive, so that a voltage drop is produced across resistance 9, which now may have a very high value, since it is not necessary for the voltage to be rapidly restored at the termination of the pulse, as is required for the voltage across the extinguishing resistance 4. The voltage across the ionisation tube 1 thus never drops below the extinguishing voltage of the ionisation tube plus the voltage of battery 6, since any decrease of the voltage across the tube 1 would prevent current from passing through tube 7 and resistance 9.

Owing to the high value of resistance 9, the amplification of tube 7 is very high. Irrespective of the voltage of batteries 10 and 11, the pulse across resistance 4 now has invariably the same amplitude which is approximately equal to the voltage of battery 6.

Although the circuit-arrangements of Figs. 1 and 2 produce pulses of very constant amplitude, the pulse shape still varies with the voltage of battery 10.

It has been found that, if the influence of the pulse on the voltage across the ionisation tube through tube 7 does not cease abruptly at the end of this pulse, even the pulse shape becomes independent of the voltage of battery 10. According to Fig. 3, which is otherwise substantially similar to Fig. 1, a diode 12, a condenser 13 and a resistance 14 are added and the condenser 13 is charged by a pulse to practically the peak value of the pulse. The diode 12 prevents condenser 13 from being discharged immediately, this discharge occurring slowly through resistance 14.

Figure 4:
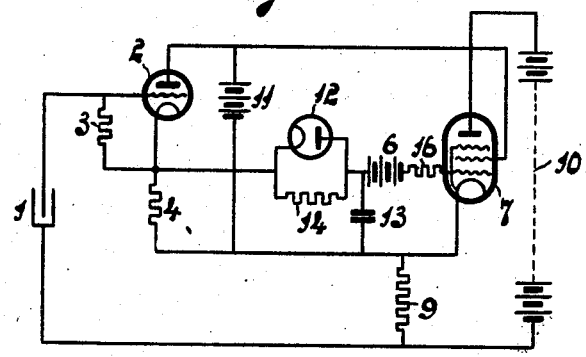

In Fig. 4 the same principle is applied provision being also made of an extinguishing circuit arrangement of the Neher-Piekering type, a negative-going pulse being produced at the grid of the extinguishing tube 2. The voltage drop across resistance 4 is now reduced and hence also the voltage across the ionisation tube 1. At the same time the voltage across condenser 13 is reduced by the diode 12 to the minimum voltage across resistance 4 during the pulse, after which supplementary charge of this condenser is effected slowly through resistance 14. The voltage is applied to the grid of tube 7 through the battery 6 and a resistance 16, which acts to limit the grid currents in the case of positive grid potential. The current flowing in tube 7 becomes lower and hence also the voltage drop across resistance 9 which assists in determining the voltage across the ionisation tube 1.

Figure 5:
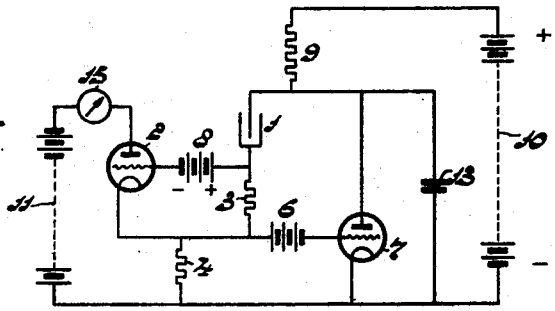

Fig. 5 is a circuit-diagram similar to Fig. 2 but for the addition of the condenser 13 which is adapted to be discharged rapidly by tube 7 at the occurrence of a pulse but is supplementarily charged slowly through resistance 9. The anode circuit of the triode 2 comprises a meter 15. The deflection of this meter is only dependent upon the number of pulses produced in the ionisation tube and does not vary with the voltages of batteries 10 and 11. In contradistinction thereto, the amplitude of the pulse varies with the voltage of battery 6 with which the value of the pulse across resistance 4, and hence also the current flowing through tube 2 and meter 15, is compared.

Figure 3:
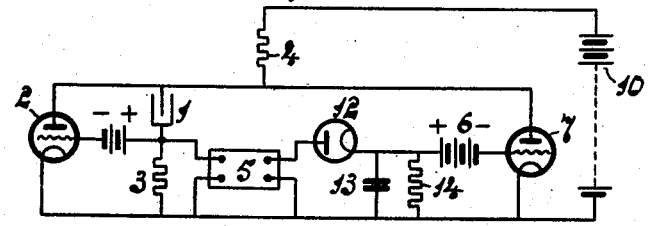
Figs. 3, 4 and 5 show three circuit-arrangements according to the invention, in which the pulse width is also independent of the supply voltage. (With reference to these figures it will furthermore be indicated how the circuit arrangement is to be used when utilizing a detection tube, in which the number of detected pulses varies greatly with the supply voltage)

If in Figs. 3, 4 and 5 condenser 13 is of very high capacity such that the charge of this condenser does not vary appreciably between two pulses as a result of the current flowing through resistance 14, the voltage across the ionisation tube assumes a substantially constant value. According to the circuit-diagram of Fig. 5 this voltage is equal to the threshold voltage of the ionisation tube 1 plus the voltage of battery 6.

This condition may be utilized with ionisation tubes in which the probability of a pulse being brought about by an incoming photon or particle depends on the voltage effective across the detection tube at the occurrence of this pulse. With non-automatically extinguishing ionisation tubes, the curve indicating the relationship between the number of pulses and the voltage across the ionisation tube often exhibits a substantially horizontal and comparatively large part, the value of the pulse being in addition primarily dependent upon the voltage at the instant of extinguishing of the discharge, so that with these tubes a lower capacity condenser 13 is often sufficient. Automatically-extinguishing ionisation tubes usually have a very narrow substantially horizontal part of the curve and in addition the value of the pulse produced depends upon the voltage at the instant the pulse starts.

The circuit-arrangements so far described may therefore be improved in this respect by choosing the capacity of condenser 13 to be such that the voltage across this condenser has varied very little when the next following pulse occurs.

Figure 6:
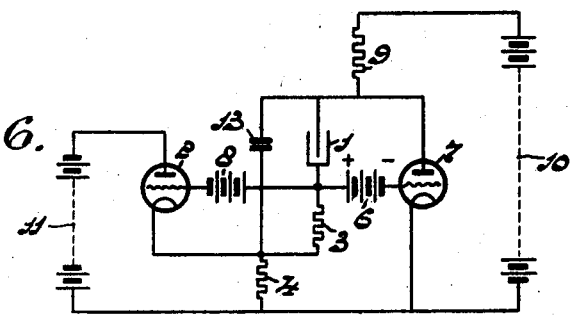
Fig. 6 shows a circuit-arrangement for use with a detection tube, no external extinguishing circuit being required.

Referring now to the circuit-arrangement of Fig. 6, comprising a self-extinguishing ionisation tube 1, condenser 13 is connected to the top end of resistance 4, in contradistinction to Fig. 5, because tube 2 is not required to supply any extinguishing voltage. It has been found here the pulses are substantially equal to one another in amplitude, width and shape, even though the supply voltage varies within wide limits.

It should be noted that, for the sake of simplicity, the figures show batteries for the supply voltage, which, obviously, may be substituted by other suitable voltage supply devices known per se. Since variations in the supply voltage are no longer troublesome owing to the use of the invention, these devices may be of simple construction, being realised, for example, as mains supplied rectifiers.

Figure 7:
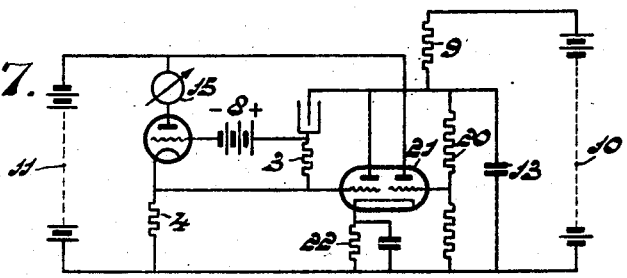
Fig. 7 shows a further embodiment of the circuit-arrangement according to the invention.

The voltage with which the pulse is compared, supplied in Fig. 6 by battery 6, may be taken from the condenser 13 connected across the ionisation tube. For this purpose, the voltage across tube 1, is divided with the use of a high-ohmic potentiometer and supplied to a cathode follower or other suitable energy amplifier. Battery 6 may thus be dispensed with. Such a circuit-arrangement is shown in Fig. 7, the potentiometer being designated 20, the cathode-amplifier circuit 21. Resistance 22 has produced across it a voltage which replaces the voltage of battery 6.

The invention is also applicable, if the ionisation tube is substituted by a photo-electric cell or a secondary-emission tube.

If, in Fig. 7, resistance 4 is shunted by a condenser, the pulse value remains independent of the supply voltage; however, it then varies with the rate at which the pulses succeed each other, so that the indication of meter 15 is no longer directly proportional to the number of pulses per unit time. This is sometimes desirable, for example, if a large measuring range is required to be served.

The triode tubes shown in the figures, for the sake of simplicity, may naturally be substituted by multigrid tubes.

Figure 8:
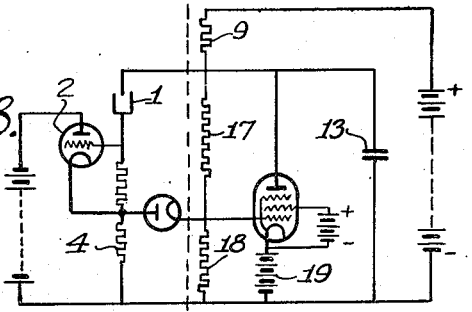

Fig. 8 shows a circuit-arrangement which is particularly suitable if it is required that some few pulses per minute only are to be counted. In some cases it is inconvenient that the voltage across the ionisation tube may now rise to practically the maximum supply voltage. In the circuit-arrangement of Fig. 8, the part of the circuit-arrangement to the right of the broken line operates as a voltage-control circuit, so that the voltage across condenser 13 is adjusted to a value which is approximately equal to $$\frac{R_{17}+R_{18}}{R_{18}} \times B \text{ volts}$$

where $R_{17}$ and $R_{18}$ designate the resistance values of resistances 17 and 18 and B the voltage of battery 19. The values of resistances $R_{17}$ and $R_{18}$ are chosen such that the voltage across condenser 13 just exceeds the voltage required across condenser 13 during the counting of a sufficient number of pulses per minute. If, now, from the left-hand part of the circuit-arrangement is applied, a voltage pulse is produced across resistance 4 on the ionisation tube 1 becoming conductive, this voltage is compared with the voltage B of battery 19 and condenser 13 is discharged through the tube 30, until these voltages have become practically equal to one another.

What I claim is:

1. A circuit-arrangement for indicating energy in the form of photons or corpuscular particles comprising a radiation detector, a voltage supply connected to said detector whereby said detector yields pulses in response to applied energy, said supply being subject to fluctuation and apparatus for maintaining the amplitude of said pulses constant and independent of said fluctuation including means coupled to said detector and responsive to the amplitude of said pulses for reducing the voltage across said detector to an extent compensating for said fluctuation when the amplitude of said pulses exceeds a predetermined value.

2. A circuit-arrangement for indicating energy in the form of corpuscular particles comprising a radiation detector wherein an automatic discharge occurs above a prescribed threshold voltage to produce pulses in response to applied energy, a voltage supply connected to said detector, said supply being subject to fluctuation an external extinguishing circuit coupled to said detector for terminating said discharge, and apparatus for maintaining the amplitude of said pulses constant and independent of said fluctuation including means responsive to the amplitude of said pulses for reducing the voltage across said detector to an extent compensating for said fluctuation when the amplitude of said pulses exceeds a predetermined value.

3. A circuit-arrangement, as set forth in claim 2, wherein said detector is constituted by an ionization tube.

4. A circuit-arrangement as set forth in claim 2 wherein said detector is constituted by a secondary emission tube.

5. A circuit-arrangement as set forth in claim 2 wherein said detector is constituted by a photocell.

6. A circuit-arrangement for indicating energy in the form of photons or corpuscular particles comprising a Geiger-Müller tube wherein an automatic discharge occurs above a predetermined threshold voltage to produce pulses in response to applied energy, a voltage supply connected to said tube, said supply being subject to fluctuation a first resistance interposed between one end of said supply and said tube, a second resistance interposed between the other end of said supply and said tube, an external extinguishing circuit coupled to said tube for terminating said discharge, and apparatus for maintaining the amplitude of said pulses constant and independent of said fluctuation and including an electron discharge device having a cathode, a control electrode and an anode, said anode being connected to the junction of said tube and said first resistance said cathode being connected to the other end of said supply, means for applying an amplified voltage proportional to the pulses developed across said second resistance to the control electrode of said device and means biasing said device to a point at which said device is rendered conductive to reduce the voltage across said tube to an extent compensating for said fluctuation when the amplitude of said pulses exceeds a predetermined value.

7. A circuit-arrangement for indicating energy in the form of photons or corpuscular particles comprising an ionization tube wherein an automatic discharge occurs above a predetermined threshold voltage to produce pulses in response to applied energy, a voltage supply connected to said tube, said supply being subject to fluctuation, a first resistance interposed between said tube and one end of said supply, a second resistance interposed between said tube and the other end of said supply, an external extinguishing circuit coupled to said tube for terminating said discharge and including a first electron discharge device having a cathode, a grid and an anode, said anode being connected to the junction of said first resistance and said tube, said cathode being connected to said other end of said supply and means connecting said grid to the junction of said tube and said second resistance, and apparatus for maintaining the amplitude of said pulses constant and independent of said fluctuation including a second electron discharge device having a cathode, a control electrode and an anode, the anode of said second device being connected to the junction of said tube and said first resistance, the cathode of said second device being connected to said other end of said supply, means to amplify the pulses developed across said second resistance to produce a control voltage and means including a bias voltage source to apply the control voltage to said control electrode to render said second device conductive to reduce the voltage across said ionization tube to an extent compensating for said fluctuation when the amplitude of said pulses exceeds a predetermined value.

8. An arrangement, as set forth in claim 7, wherein said means to apply said control voltage to said control electrode of said second device includes a diode interposed between said amplifier and said control electrode and a resistance-capacitance parallel network connected between the cathode of said second device and the control electrode thereof.

9. A circuit-arrangement for indicating energy in the form of photons or corpuscular particles comprising an ionization tube wherein an automatic discharge occurs above a predetermined threshold voltage to produce pulses in response to applied energy, a voltage supply connected to said tube, said supply being subject to fluctuation, first and second resistances connected in series between said tube and one end of said supply, a third resistance connected between said tube and the other end of said supply, an external extinguishing circuit coupled to said tube for terminating said discharge and including a first electron device having a cathode, a grid and an anode, a voltage source having one end connected to said anode and the other end connected through said second resistance to said cathode and means connecting said grid to the junction of said tube and said first resistance, and apparatus for maintaining the amplitude of said pulses constant and independent of said fluctuation including a second electron discharge device having a cathode, a control electrode and an anode, the cathode of said second device being connected to said one end of said supply, the anode of said second device being connected to the junction of said tube and said third resistance, and means including a bias voltage source for applying the pulses developed across said second resistance to the control electrode of said second device to render said second device conductive to reduce the voltage across said ionization tube to an extent compensating for said fluctuation when the amplitude of said pulses exceeds a predetermined value.

10. A circuit-arrangement, as set forth in claim 9, further including a capacitor connected between the anode and cathode of said second device.

References Cited in the file of this patent

UNITED STATES PATENTS

| Number | Name | Date |
| --- | --- | --- |
| 2,383,478 | Friedman et al. | Aug. 28, 1945 |
| 2,408,230 | Shoupp | Sept. 24, 1946 |
| 2,443,857 | Herzog | June 22, 1948 |
| 2,465,933 | Shonka | Mar. 29, 1949 |
| 2,495,072 | Molloy | Jan. 17, 1950 |

OTHER REFERENCES

Electrical Counting, W. B. Lewis, published by The Macmillan Co., New York, N. Y., 1943, pgs. 98–113.